United States Patent [19]

Kupersmith et al.

[11] Patent Number: 4,622,551
[45] Date of Patent: Nov. 11, 1986

[54] HALF-DUPLEX INDUSTRIAL COMMUNICATIONS SYSTEM

[75] Inventors: Bertram F. Kupersmith; Julian H. Shull; Gary G. Full; Gregory A. Schienda, all of Tucson, Ariz.

[73] Assignee: Otis Elevator Company, Farmington, Conn.

[21] Appl. No.: 546,219

[22] Filed: Oct. 27, 1983

[51] Int. Cl.[4] .................. H04Q 9/00; H04L 25/00
[52] U.S. Cl. ...................... 340/825.06; 375/36; 370/31
[58] Field of Search .............. 340/825.06, 825.52, 340/825.5, 825.14; 370/85, 55, 31; 375/36

[56] References Cited

U.S. PATENT DOCUMENTS

| | | | |
|---|---|---|---|
| 3,237,164 | 2/1966 | Evans | 375/36 |
| 3,290,653 | 12/1966 | Slattery et al. | 375/36 |
| 4,038,601 | 7/1977 | Laborie et al. | 375/36 |
| 4,121,054 | 10/1978 | Popkin | 370/55 |
| 4,254,501 | 3/1981 | Griffith | 370/31 |
| 4,328,586 | 5/1982 | Hansen | 370/85 |
| 4,412,326 | 10/1983 | Limb | 370/85 |
| 4,534,025 | 8/1985 | Floyd | 370/85 |

Primary Examiner—Donald J. Yusko
Attorney, Agent, or Firm—Dominic J. Chiantera

[57] ABSTRACT

A serial signal communications system includes a central station unit connected through a balanced impedance signal communication bus to one or more remote station units.

9 Claims, 4 Drawing Figures

HALF-DUPLEX INDUSTRIAL COMMUNICATIONS SYSTEM

1. Technical Field

This invention relates to signal communications systems, and more particularly to serial digital signal communications systems.

2. Background Art

Serial digital signal communications systems are well known. These systems vary in architecture, protocol, baud rate, etc., depending on the application and type of information to be exchanged. All serial systems, however, share a common susceptibility to induced noise which may affect signal transmission accuracy. In control system communications of the type in which a central control regulates the operation of one or more remote controlled devices, induced noise considerations are paramount. Although conventional noise protection, such as shielding of the systems' transmission lines, does provide a high degree of noise immunity, it is costly. In addition, where the serial communications system must be installed in existing structures the use of shielded transmission lines may be impractical.

In providing serial communications between a central control station and one or more remote stations a number of overhead operations must be performed by the central control signal processor to regulate data flow and monitor data integrity. In an industrial environment (e.g. high noise environment) distortion of the transmitted signal by ambient noise may be the most important consideration, since induced noise may create erroneous data and, therefore, incorrect control commands. As a consequence the need for constant error checking to ensure data integrity may result in higher control system overhead, necessitating a larger signal processor than that required for the control system protocol. In other words, the control signal processor must be larger simply to service the demands of the communications network itself, apart from the actual control function.

DISCLOSURE OF INVENTION

One object of the present invention is to provide a serial data communications system for reducing the input/output (I/O) overhead between a central station signal processor and I/O signals remote from the central station. Another object of the present invention is to provide a communications system with high noise immunity for providing high integrity serial data communications in industrial applications.

According to the present invention, a serial signal communications system includes a central station unit connected through a balanced impedance signal communication bus to one or more remote station units, the central station unit having I/O signal ports responsive to each remote station unit and responsive to the signal processor of a user control system, each remote station unit similarly having I/O signal ports responsive to the central station unit and to an associated remote controlled device of the user control system. In further accord with the present invention, the communications bus includes a signal data transmission line connected at each end to low pass filter termination networks and connected along its length to the I/O signal ports of the central and remote station units, the low pass filter termination networks providing a balanced impedance matching of the transmission line to the central and remote station unit I/O ports at the selected signal transmission frequency, and providing common mode rejection of signal frequencies above the selected signal transmission rate. In still further accord with the present invention, the data transmission line comprises unshielded, twisted pair signal lines connected at each end to one input of an associated termination network low pass filter, the other side of each filter connected to a signal ground center tap of the network, and the lines connected along their length to a differential I/O signal port provided on the central station unit and each remote unit, whereby transmission line signal information is transmitted and received differentially at the I/O signal ports of the central and remote station units. In still further accord with the present invention the communication bus further includes electrical power distribution lines, including high potential and low potential lines connected between the high potential and low potential outputs of an associated power supply and the corresponding electrical power inputs of the central and remote station units, the low potential line being connected to the signal ground center tap of the transmission line termination networks. In still further accord with the present invention, the central station unit provides synchronous, bidirectional communication with each remote station unit in a tristate signal format.

In still further accord with the present invention, the central and remote stations each include an identical industrial control unit (ICU), the ICU capable of functioning alternately in a master mode for central station use and in a slave mode for remote station use, each ICU providing the I/O differential signal port interface with the signal communications bus and providing the I/O signal interface with the corresponding user system signal processor or remote controlled device.

The present communications system is characterized by high noise immunity signal transmission despite the use of unshielded transmission lines. This is due to the system architecture which includes a balanced transmission line terminated at each end in narrow band, low pass filter networks which provide low signal frequency impedance matching and high signal frequency common mode rejection. The signal information on the transmission line is transmitted and received differentially at all station ICUs to further enhance noise rejection. In addition, the lack of transmission line shielding permits flexibility in system installation in existing structures, and an inherently lower system cost.

These and other objects, features, and advantages of the present invention will become more apparent in light of the following detailed description of a best mode embodiment thereof, as illustrated in the accompanying drawing.

BEST MODE FOR CARRYING OUT THE INVENTION

Figure 1:
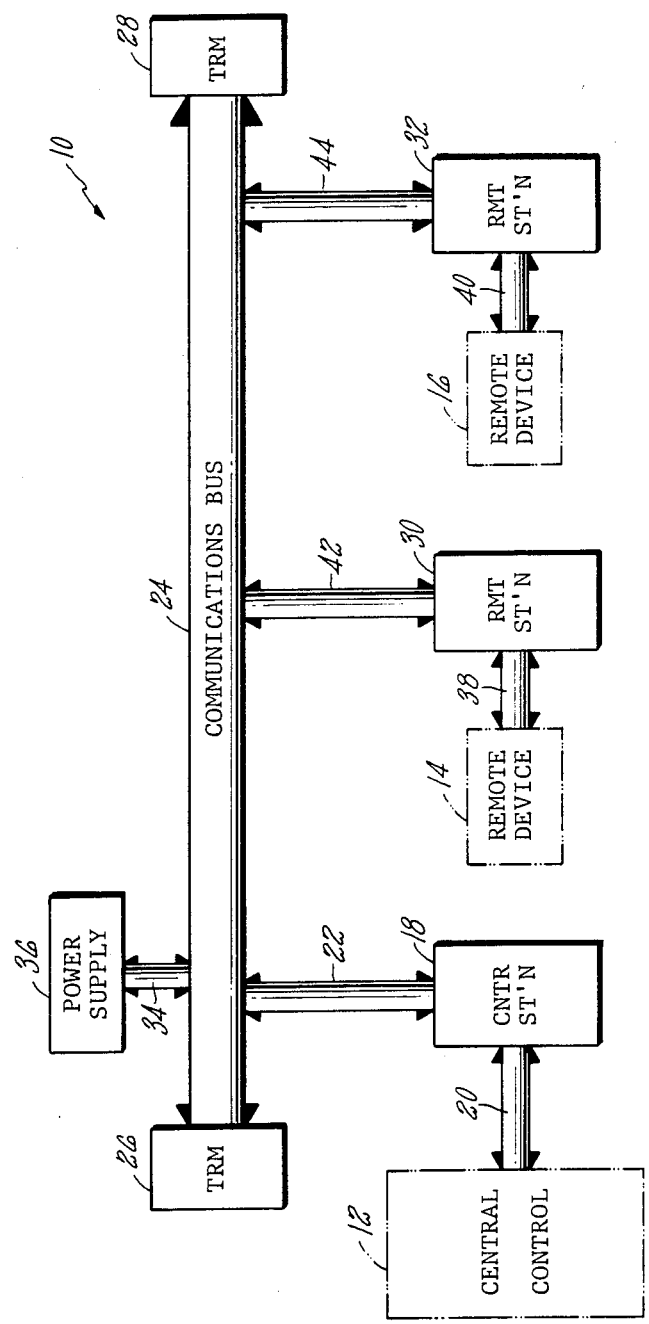
FIG. 1 is an architectural block diagram of the industrial communications system of the present invention.

FIG. 1 is an architectural block diagram of the communications system 10 of the present invention, which provides signal communications between a user system central control 12 and one or more remote controlled devices 14, 16. The user system central control and remote controlled devices are shown in phantom.

The communications system includes a central (master) communications station 18 with input/output (I/O) lines 20 to the central control and I/O lines 22 to the signal communications bus 24. The bus is dual function. As described hereinafter with respect to FIG. 2, the bus includes a data transmission bus with balanced termination networks 26, 28 for providing time division multiplexed signal communication between the central station and one or more remote (slave) stations 30, 32, and it further includes a power bus for providing DC power to all stations. The DC power is supplied to the bus on lines 34 from power supply 36. The remote stations 30, 32 are connected through lines 38, 40 to their associated remote devices 14, 16, and through lines 42, 44 to the bus.

Figure 2:
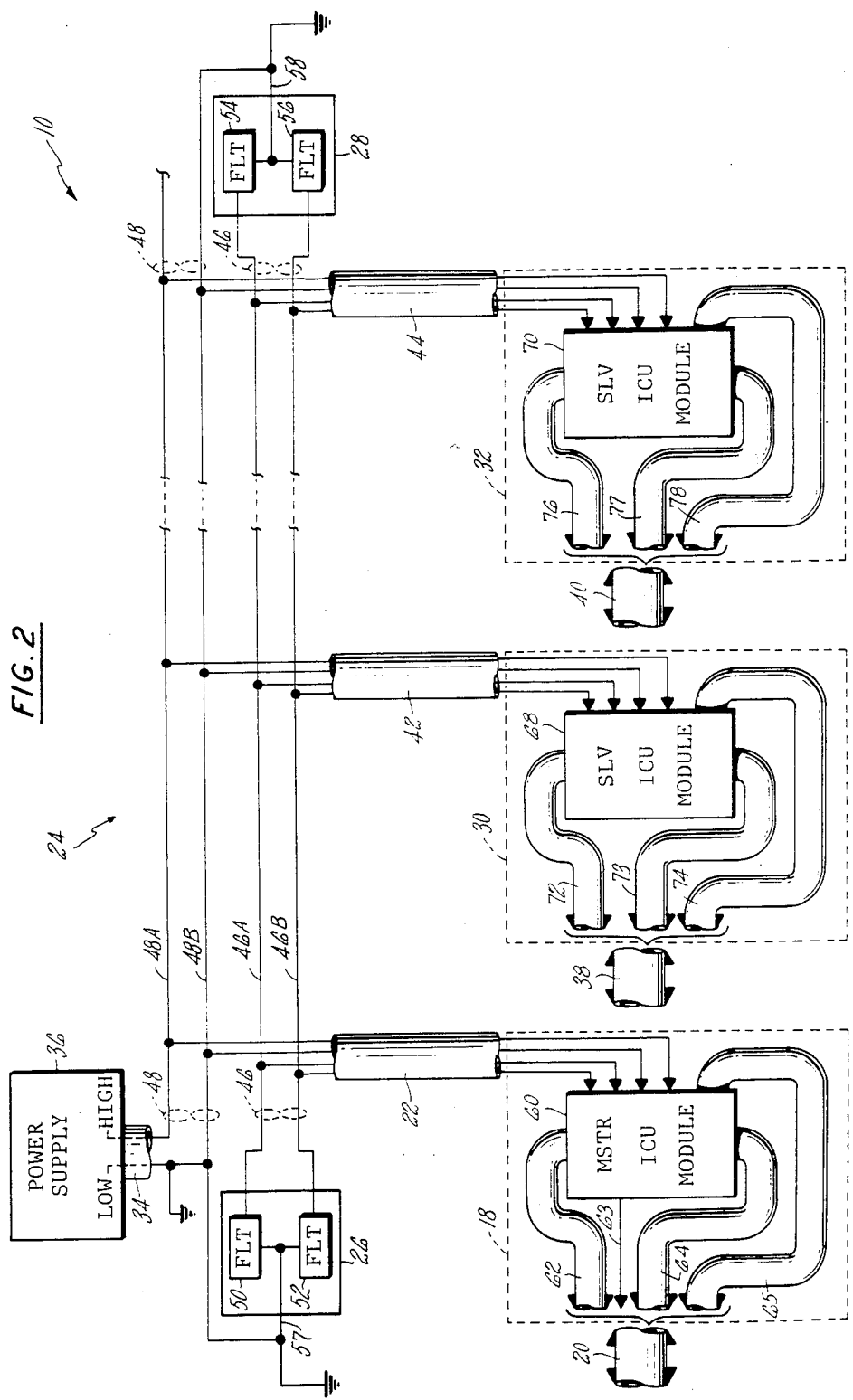
FIG. 2 is a schematic block diagram of a best mode embodiment of the communications system of claim 1.

FIG. 2 is a schematic diagram of the communications system 10. As shown the bus 24 includes wire pairs 46, 48. Both wire pairs are unshielded to facilitate installation in the user system's structural environment, and to reduce cost. The pair 46 with lines 46A, 46B, is the data transmission bus and is preferably a twisted wire pair. The pair 48 is the power bus with lines 48A, 48B connected to the low and high voltage potential outputs of the power supply 34. It provides DC power to the central and remote stations and their associated remote devices. The pair 48 may also be a twisted pair, but not necessarily so.

Since each wire pair is unshielded and subject to both high and low frequency ambient noise levels the data transmission line pair 46 is connected at each end to impedance termination networks 26, 28. Each network includes low pass filters 50, 52 for network 26 and 54, 56 for the network 28. The filters are connected at a high signal side of each to respective ends of each of the transmission line wires 46A, 46B, and at a low signal side to the network center tap. The power distribution line wire 48B, connected to the low potential output of the supply 34, is also connected to the center tap 57, 58 of each termination network. The line 48B is grounded at the center tap, i.e. the low side of each of the network filters, to provide the current return signal path for the line driver currents from the various stations on the data transmission line.

As described hereinafter, the filters provide a low frequency impedance match and maximum high frequency common mode rejection within the selected data transmission rates. Grounding the filter low sides (i.e. the network center tap) provides the shortest noise return path; the highest amplitude noise levels being at the midpoint of the transmission line. As a result, the filters are selected to provide a narrow transmission line bandwidth and high common mode rejection of high frequency voltage transients induced by foreign noise sources, e.g. relay coils and induction motors.

The central and remote stations include identical industrial communications unit (ICU) modules, each connected in the same manner to the communication bus transmission and power distribution lines. The ICU modules are capable of being programmed in either a master or slave mode; depending on the ICU module application in either the central or remote station. The central station master ICU module 60 receives the four wire bus inputs through lines 22, and provides I/O interface with the central control signal processor through lines 62–65 (included within lines 20, FIG. 1).

Similarly, the remote station slave ICU modules 68, 70 receive the four wire bus inputs through lines 42, 44 and interface with their associated remote devices through lines 72–74 and 76–78 (included within lines 38, 40 of FIG. 1).

To provide the greatest noise immunity the unshielded transmission lines 46A, 46B are preferably 18–24 AWG (0.20 to 0.86 mm$^2$) twisted pair with an approximate 100 ohms characteristic impedance and an approximate capacitance of 18 pf/ft (60 pf/meter). The power distribution lines 48A, 48B are a minimum 20 AWG wire size; the size depending on the power distribution line length with the minimum wire size associated with the maximum line length of 1,000 feet (305 meters). The power distribution line is used to supply current to only noninductive DC loads at stations, and the load current is limited to a maximum voltage drop of 2.0 VDC on the power line return. When inductive loads, large DC loads, or AC loads are controlled by the remote stations they are supplied by separate (local) power sources, and are electrically isolated from the remote station ICU.

Figure 3:
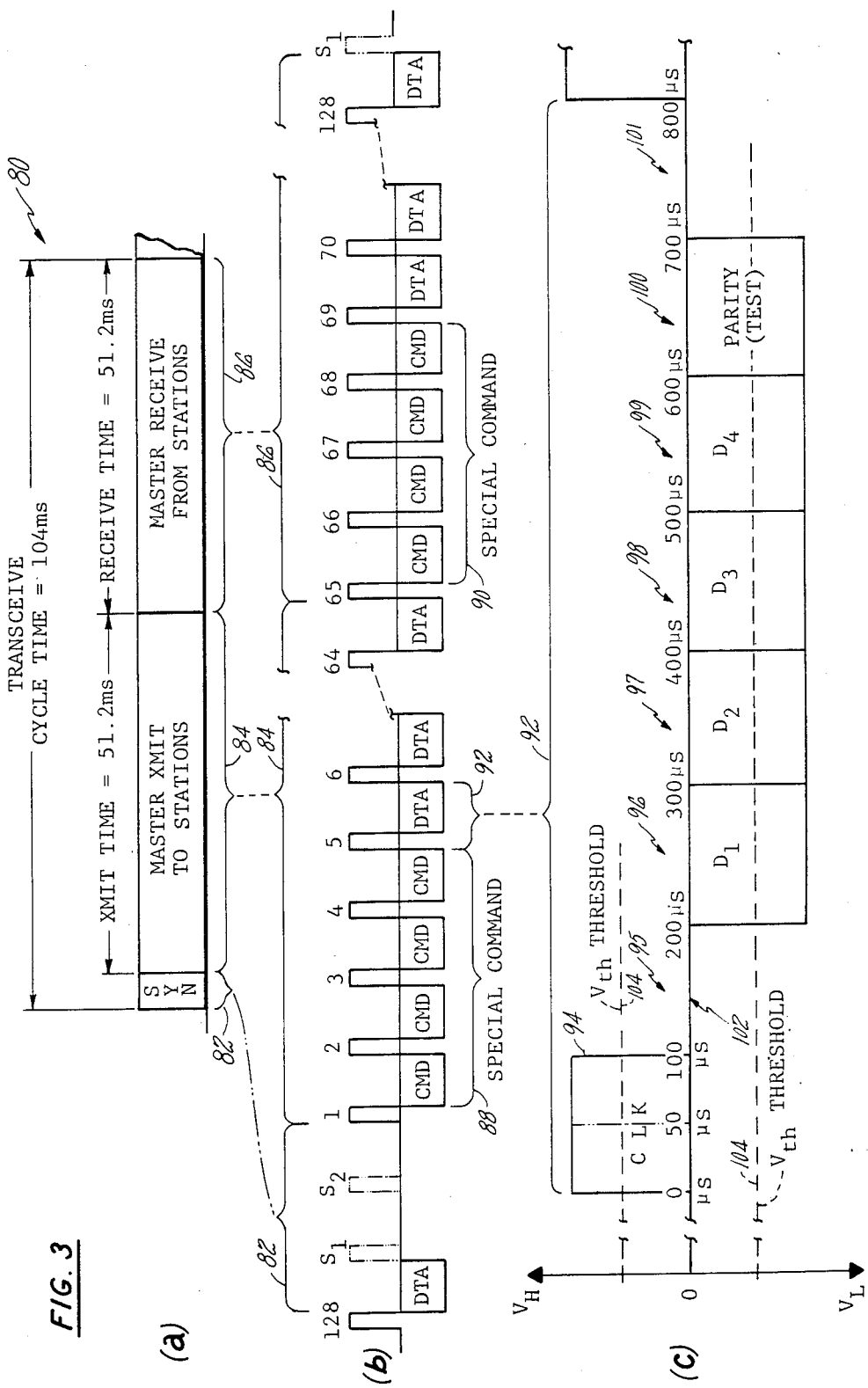
FIG. 3 is a series of waveform illustrations used in the description of the embodiment of FIG. 2.

The communications system protocol is synchronous, half duplex, serial line format by which the master ICU of the central station communicates bidirectionally, with as many as 60 slave ICU remote station units. The serial line protocol is illustrated in FIG. 3, illustrations (a)–(c). The master ICU module transmits data to, and receives data from, each of the remote slave ICUs in successive transceive cycles 80 (illustration (a)). Each cycle includes a sync frame 82 followed by 128 information frames divided equally between a transmit interval 84 (master ICU transmits to slave ICUs) and a receive interval 86 (master ICU receives from slave ICUs). Each information frame is marked by a line clock pulse transmitted at the system clock frequency. The sync frame 82 provides master to slave ICU synchronization once per cycle. It includes two line clock intervals which, when added to the 128 information frame clock pulses, requires 130 equally spaced line clock intervals for each transceive cycle.

To provide the highest noise rejection the system frequency and baud rate is selected at the lowest frequency required to satisfy the particular control application; the bandwidth being limited to compensate for the unshielded transmission line. In an exemplary embodiment of the present communication system as used in an elevator control system, as disclosed in a copending application of the same assignee entitled "ELEVATOR CONTROL SYSTEM" U.S. Ser. No. 546,225 filed by Mendelson et al on even date herewith, the transceive cycle time is 104 milliseconds (ms) to provide an approximate 9.6 Hz transceive frequency (i.e. sample time frequency). For the total 130 clock pulses and a selected 104 ms cycle time the line clock frequency is 1250 Hz (clock period 800 microseconds). Illustration (b) shows the 130 clock pulses as including two sync frame clock pulses ($S_1$, $S_2$) and 128 information frame clocks divided equally between the transmit frame 84 (clock pulses 1 through 64) and receive frame 86 (clock pulses 65 through 128). The sync frame clock pulses are actually missing. The sync frame itself is defined as the "dead time" interval (which includes the missing clock pulses $S_1$, $S_2$) between the 128th clock pulse of a preceeding cycle and the 1st pulse of a present cycle. For the 104 ms cycle time the dead time is 2300 microseconds.

The sixty four information frames in the transmit and receive intervals service up to a maximum of sixty slave ICUs. The first group of four information frames in each interval 88, 90 (clock pulses 1-4 and 65-68) are reserved for special command information to all station ICUs, such as diagnostic/maintenance testing, or control of any optional features which may be incorporated in the remote controlled devices; the remaining sixty information frames are data frames. The master ICU transmits information to each slave ICU in a related transmit interval data frame and receives data from each slave ICU in a corresponding receive interval data frame. All remote station slave ICUs receive and store the commands of frames 1-4 and 65-68 as internal commands related to their operation. These commands may include turn on and turn off of the slave ICUs (all or a selected number), or may command the slave ICUs to send specific data patterns in a diagnostic mode to allow integrity check by the central control.

Each slave ICU has an assigned clock count address. The line clock pulses are counted and decoded by the slave ICUs following each sync frame to determine the presence of an assigned count address at which time the ICU reads or writes a data frame from or to the transmission line. The format for the information frames, both special command frames 88, 90 and data frames, are identical, as shown by information frame 92 in illustration (c). The frame time interval is divided into eight 100 microseconds states. The first state (0-100 microseconds) corresponds to the clock pulse interval 94 and must be a minimum of 50 microseconds wide to be valid. The second state 95 (100-200 microseconds) is a "dead time" interval which allows for response time tolerances and sample time delays between the frame clock pulse and the data bits. The next five states 96-100 (200-700 microseconds) are five signal bit time intervals; the first four of which (96-99 correspond to the four data bits $D_1$-$D_4$. The bit time is equal to the state time, or 100 microseconds for the selected 104 ms transceive cycle time. The fifth bit is a special feature bit which may be received and transmitted by each of the slave ICUs. This fifth bit is used for special feature information which may include test routines, i.e. parity test. In the best mode embodiment the fifth bit is used to convey the special information in 36 of the available 64 information frames in each transmit and receive interval; specifically in information frames 5-40. The last state 101 is also a dead time interval prior to the beginning of the succeeding data frame.

As shown in FIG. 3 the signal data format is tristate, i.e. bipolar. The transmission line provides a differential, three state signal transmission in which the signal, as measured between the transmission line wires 46A, 46B, is in one of three states. The line 46A is the clock line input to the ICUs; the line 46B being the data line input. The three differential states are measured with respect to the difference potential between lines 46A and 46B. When the signal magnitude on the line 46A is greater than the sum of the signal magnitude on the line 46B plus a threshold voltage ($V_{th}$) 104 then the differential state is equal to a line clock pulse (94, illustration (c)). When the signal magnitude on the line 46B is greater than the sum of the line 46A magnitude plus the selected threshold voltage the differential state input is recognized as a logic one in signal bit times 96-100. If the line 46A-46B differential magnitude is less than the threshold value the differential state is recognized as a signal bit logic zero 102.

The approximate data rate for the selected 104 ms cycle time is 10 KBAUD for the four data bits ($D_1$-$D_4$) and special fifth (test) bit of each information frame. It should be understood, however, that the present system is not limited to either the illustrated baud rate or bit number. In the present communications system higher data rates and/or more information bits may be traded off against maximum line length and noise immunity requirements.

Figure 4:
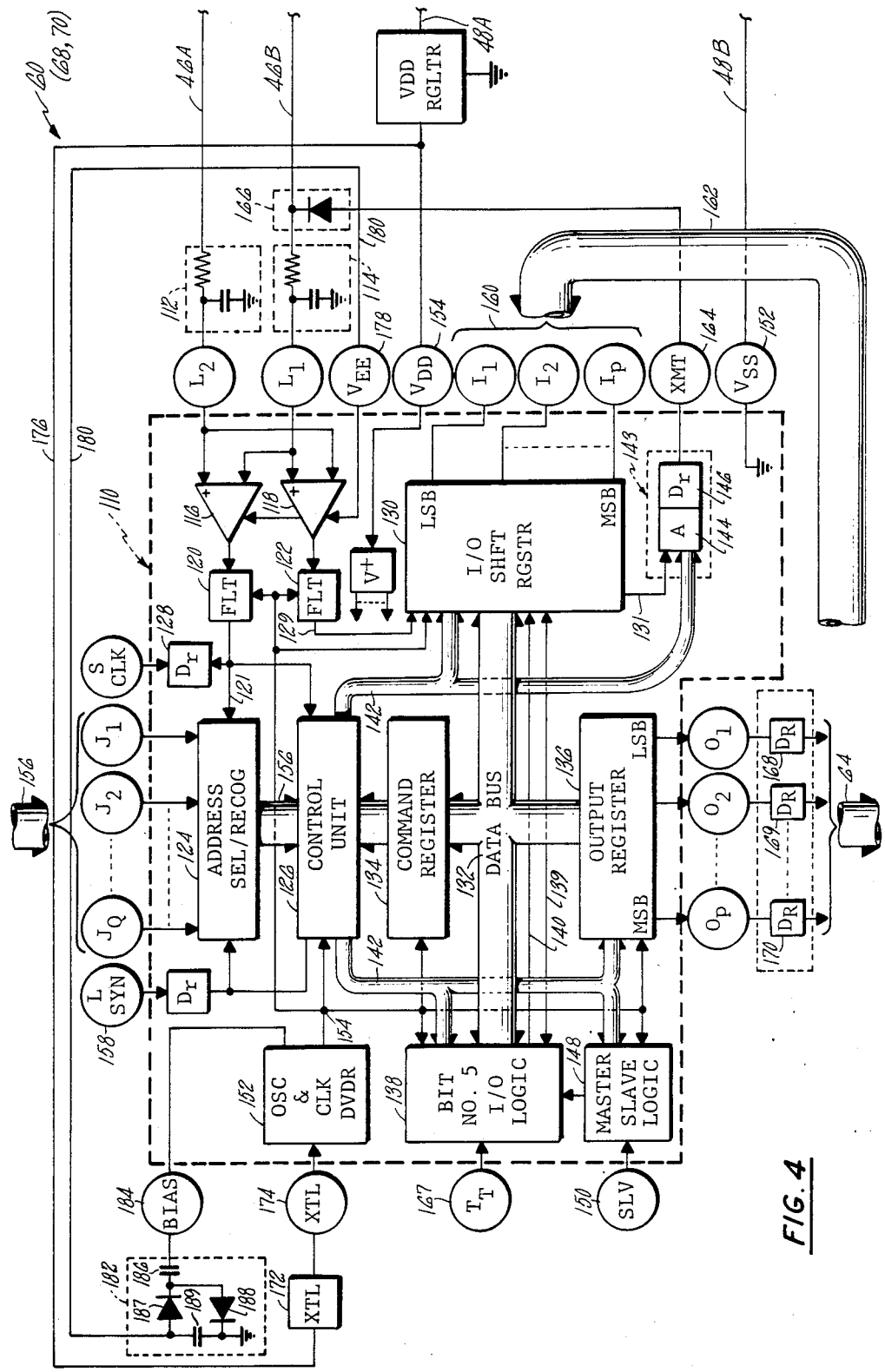
FIG. 4 is a schematic diagram of an ICU module as used in the embodiment of FIG. 2.

Referring now to FIG. 4, in a schematic illustration of the ICU modules 60 (68, 70), each module comprises an ICU 110 together with peripheral circuitry described hereinafter. The data transmission lines 46A, 46B are presented through input filters 112, 114 to the differential data inputs ($L_2$, $L_1$) of the ICU module. The filters are typically first order RC networks with a time constant dependent on system speed. At the cycle time and data rates selected for the exemplary elevator control system embodiment each filter time constant is on the order of 2.5 microseconds (typically 5K ohms and 500 pico farads) which limits common mode voltage transients without degrading system data rate. Input power to the ICU is a regulated DC voltage ($V_{DD}$) provided by voltage regulator 115 from the power bus. The regulator is a known type preferably a three terminal LM78L08 or LM317L.

The ICU input data at $L_1$, $L_2$ is received by differential comparators 116, 118 which provide in combination a differential line receiver. The data and line clock threshold voltages Vth (104, FIG. 3 illustration (c)) which the receiver uses to sense a clock pulse at $L_2$ with respect to the data input $L_1$, and to sense the data bits at $L_1$ with respect to $L_2$ are differential voltages; the presence of a DC common mode voltage will not affect the threshold set point. Typically, the Vth threshold is equal to one-half the minimum voltage swing on the transmission line (or the minimum line current) (Io $_{MIN}$) multiplied by the minimum line impedance ($Z_L$); typically 0.5 to 0.6 volts. The signal outputs of each comparator are logic zero whenever the $L_1$ and $L_2$ inputs are less than Vth.

The output signals from each comparator are presented to digital filters 120, 122. For the selected system data rates the filters are preferably four bit digital filters with a sample rate of 8.9 microseconds. The filters use a best three out of four sample averaging algorithm before allowing the filter output to change states. The signal output from the line clock ($L_2$) filter 120 is presented simultaneously to address select/recognize logic circuitry 124, control unit 126, and through output buffer 128 to the serial data clock output from the ICU (SCLK) which may be used for peripheral equipment. The signal data from the $L_1$ filter 122 is presented on line 129 to a serial data input of I/O shift register 130; a multifunction five bit shift register with dual serial-to-parallel modes. The serial data received on line 129 is parallel formatted by the register and presented to the ICU data bus 132 which interconnects the I/O register 130 with: a command register 134, an output register 136, and the fifth bit I/O logic circuitry 138. The fifth bit logic circuitry is used to transmit and receive fifth bit information to the associated remote devices, as necessary. The I/O shift register 130 is interconnected with the fifth bit I/O logic circuitry through control lines 139, 140, and receives command information from the control unit 126 on lines 142. The control unit also provides command information to: the ICU data transmitter circuitry 143 (which includes AND gate 144 and line driver 146), to the fifth bit I/O logic circuitry 138, to the ICU master/slave logic circuitry 148, and to the ICU output register 136.

In the preferred embodiment the control unit is sequential; providing a series of ordered, chronological commands within each information frame. The control algorithm commands are marked by a control unit clock having a higher frequency than the line frequency clock. The exact control unit frequency is selectable; depending upon the number of sequence steps involved. Typically, the control unit provides a sequence of 17 command instructions, and the control clock pulses are provided from the oscillator and clock divider circuitry 152 on lines 154 at a frequency on the order of 20 KHz for the selected 104 ms cycle time.

In the operation of the ICU the received line clock pulses on line 121 are counted by address circuitry 124 and compared with the ICU's assigned address, as programmed by the multibit address circuitry input ($J_1$–$J_Q$). The address input is either fixed (for a slave ICU) or dynamic (for master ICU). The master/slave status is set by logic circuitry 148; for a master ICU in the central station (18, FIG. 1) the SLV input 150 is set at logic zero and for a slave ICU the SLV input is a logic one. For the master ICU of the central station the $J_1$–$J_Q$ inputs are connected through address lines 156 to the signal processor of the central control (12, FIG. 1) to allow the central control to change the master ICU address to allow it to access specific information (data) frames during I/O transfer. In a slave ICU the address inputs may be fixed encoded through connection of individual inputs to signal ground or VDD to provide the selected binary address.

By keeping track of the input address count the ICU address recognition logic 124 differentiates between ICU read and write cycles; these two cycles are reversed in master and slave ICUs with respect to line clock count. The slave ICUs read command information from the master in the first four information frames of master transmit interval (84, FIG. 3), following the sync frame (82, FIG. 3). A fifth data bit (100, FIG. 3(c)) is transmitted from the master ICU to the slave ICUs during each information frame of the master transmit interval (84, FIG. 3). The slave ICUs may multiplex the fifth data bit of information frames 4–40 to the output of bits I/O logic circuitry 138 ($T_T$, FIG. 4) under command. All slave ICUs read master data in the master transmit interval information frames 5–64. The master reads each of the slave ICU data outputs in the master receive interval (86, FIG. 3) on line clocks 68–128; no data is written by the slaves in addresses 65–68, which are the master ICU read frames for addresses 1–4. In event that the address recognition circuitry detects an addressing error, e.g. more than 128 line clock pulses, the ICU transmitter 143 is disabled and a "loss of sync" is signaled on ICU (LSYNC) output 158. This occurs in both master and slave ICUs and the loss of sync signal state persists until a new sync frame is detected.

The command data in the first four information frames is read by the ICU command register from the ICU data bus 132. A slave ICU receives the command data from the transmission line 46 through the serial input of register 130; the master ICU receives the command data at parallel inputs $I_1$–$I_p$ 160 of the register 130, from lines 162 and the user system central control. The function of each of the command bits, the four data bits and special fifth bit, are established based on the user system requirements. However, at least one bit (the most significant bit) is used for parity indications.

Aside from command frame inputs the ICU detects its assigned address from the clock count and latches the data frame from line 129 onto data bus 132. The slave ICU transmitted data (master receive interval 86, FIG. 3) is the data received by the slave ICU at inputs 160 from the associated remote devices (14, 16, FIG. 1) on lines 162. The data is latched into bits 1–4 of I/O register 130 during the master transmit interval 84, FIG. 3. The fifth data bit (if present) is loaded from the fifth bit I/O logic circuitry 138. At the slave ICU transmit address state register 130 shifts the five bit information frame serially through line 131 to AND gate 144, which controls the line driver 146 of the ICU transmitter 143. The control unit 126 provides a gate enable signal on lines 142 such that a data logic one turns line driver 146 on and a logic zero turns it off. The ICU data is transmitted through ICU XMT output 164 and steering diode 166 to the transmission line 46B. The diode 166 allows the ICU to "source" current to the transmission line during transmission of logic one bits, but prevents any "sinking" of current when the transmission line is more positive than the XMT output. This prevents ICU latch-up.

ICU data transmission is single ended with respect to ground, e.g. line 46B. Therefore, the termination networks are an integral part of the ICU transmitter, providing a ground return for the sourced logic one currents on the line. The ICU line receiver (comparators 116, 118) is differential, such that the receivers provide the common mode noise rejection.

Latching of the data on at inputs 160, shifting transmission line data from filter 122 to I/O register 130, and shifting either data from register 130 to the data bus 132, is provided by sequence instructions from the control unit 126. Similarly the control unit allows output register 136 to use I/O register 130 in a serial in/parallel out mode to shift transmission line data from line 129 to the ICU data bus 132. Four data bits are parallel loaded from the bus into the output latch of the output register as ICU outputs $O_1$–$O_p$ (LSB to MSB). The fifth data bit is presented through I/O logic circuitry 138 to the $T_T$ output 167 of the master ICU in any of the master receive interval information frames, and to the $T_T$ output of the slave ICUs, on command, in frames 4–40 of the master transmit interval. The ICU output bits ($O_1$–$O_p$) are presented through line drivers 168–170 to I/O lines 64, (73, 77) to the associated user system equipment (e.g. central control or remote devices).

The slave ICU peripheral elements include crystal (XTL) 172 connected between the XTL input 174 to ICU oscillator 152, and line 176 to the regulated $V_{DD}$ voltage. The crystal provides a typical 3.58 MHZ signal to the oscillator. The master ICU XTL input 174 is connected to the line clock driver output of the I/O interface with the central control circuitry.

The comparators 116, 118 of the ICU line receiver are negatively biased by a DC voltage signal at the $V_{EE}$ input 178. The bias is provided on line 180 from $V_{EE}$ charge pump 182. The charge pump, which is also connected to a XTL/2 signal frequency from the ICU oscillator 152 at BIAS output 184, includes series capacitor 186 connected through a pair of oppositely polled, parallel diodes 187, 188 to opposite sides of a second capacitor 189. The diode 188 and capacitor 189 are connected to signal ground. The capacitors, approximately 0.01 microfarads each, in combination with the diodes invert and rectify the 1.78 MHz BIAS output to produce an approximate −6.0 VDC at 1.0 milliamp to each comparator. This negative bias increases the comparator's negative common mode range to nominally center the comparator inputs and provide optimal common mode range to the differential input signals on the transmission lines 46A, 46B.

In a serial data communication system of the present type there are three major sources of signal-to-noise (SNR) degradation. These include (i) signal attenuation due to the length of the transmission line (1,000 ft, 305 meters maximum), (ii) signal reflections due to mismatched impedances (both characteristic line impedance and I/O impedance of ICU), and (iii) common mode noise due to lack of transmission line shielding. In the present system the twisted pair transmission line is preferably stranded, to allow ease of installation and lower parasitic capacitance. For 18 AWG to 24 AWG wire sizes the characteristic impedance varies from 90 to 120 ohms per 1,000 feet. With 10K baud data rates the signal attenuation is on the order of 0.25 db/100 feet, or 2.5 db for a 1,000 foot transmission line. A logic one signal of 2.5 V transmitted from one end of a 1,000 foot line arrives at the other end at 1.87 volts, neglecting signal reflections. The effect is negligible, and with proper selection of the $V_{th}$ threshold levels the line attenuation effect is invisible to data transmission.

Signal reflections due to laod mismatch between remote ICU stations (or due to the remote station line taps from the transmission line) are dampened by the termination networks at each end of the transmission line. The termination network impedance is set equal to the transmission line characteristic impedance Zo (determined by wire size). The transmission line load impedance $Z_L$ is the parallel combination of the termination network impedance and the I/O impedances of all ICUs connected to the line. The ICUs are preferably CMOS (Complementary Metal Oxide Semiconductor) IC devices. The ICU input impedance (ICU line receiver) is on the order of 100K ohms and the ICU output impedance (the tristate line driver, 146, FIG. 4) is on the order of 5M ohms. For a maximum of 60 remote stations the equivalent I/O impedance is approximately 800 ohms. This value, in parallel with the termination network impedance (equal to the characteristic impedance Zo of the line, e.g. approximately 100 ohms, results in a load impedance of approximately 88.4 ohms. The line reflection coefficient is $\rho_v=(Z_L-Z_O)/(Z_L+Z_O)$, where $Z_L$ is the load impedance (88.4 ohms) and $Z_O$ is the characteristic line impedance (100 ohms), is 0.062v/v. A 2.5 V pulse started at one end of the line would result in 0.16 volts being reflected back to the source ICU and 2.34 volts would reach the termination. The reflection coefficient is negligible and it too may be accounted for by selection of the ICU threshold voltages ($V_{TH}$).

Signal reflections due to the remote station taps off of the transmission line are also negligible, since: (i) the characteristic impedance of the station tap is the same as the main transmission line, (ii) the twisted pair cable is not untwisted for cable lengths greater than one-quarter wavelength, and (iii) the tap length are typically three orders of magnitude less than one-quarter wave length.

Common mode voltage noise sources could be signals propagating close to the transmission line, such as the power distribution line, or other control voltage signals associated with the user system. They may also be fluoresent lights or electric motors. For 60 Hz noise sources the transmission line termination networks and input RC filters on each ICU line receiver limit the common mode voltages to approximately one millivolt. For higher frequencies noise sources, such as motors or relays which produce a broad band spectrum of noise as high as five to ten MHz, a significantly higher common mode noise level appears at the ICU inputs. For example a 10 MHz capacitively coupled noise, the common mode voltage signal could be as high as 290 V for a 300 V noise amplitude, if line attenuation is neglected. In reality the magnitude of these high frequency common mode signals is considerably smaller due to second order effects caused by nonlinear processes in the noise source itself. In addition, transmission line signal attenuations significantly reduce the high frequency common mode signals, such that their common mode amplitude is limited a few volts as opposed to hundreds of volts. Finally, the differential comparators used in the ICU line receiver have common mode rejection ratios (CMRR) on the order of 60 db so that the perceived common mode signal from the high frequency sources would be reduced to the millivolt level.

As indicated hereinbefore the central station master ICU and remote station slave ICUs are each tapped off of the transmission line 46 through quarter wave length, or less, connections, thereby limiting signal reflections back to the transmission line. In the preferred embodiment the central station with master ICU is shown connected at one end of the transmission line; the remote station ICUs distributed along the transmission line length between the master ICU and the far termination network. In this embodiment the close proximity of the master ICU to a line termination network allows the master ICU to be connected through a simple quarter wave tap. It should be understood that the master ICU need not be connected only at an end of the transmission line. However, if connected at other than an end of the transmission line the master ICU itself would require a termination network in addition to those connected at each end of the transmission line.

Although the invention has been shown and described with respect to a best mode embodiment thereof, it should be understood by those skilled in the art that the foregoing and various other changes, omissions and additions in the form and detail thereof may be made therein without departing from the spirit and scope of this invention.

That which we claim, and desire to secure by Letters Patent, is:

1. A serial data communications system for providing synchronous half duplex data signal communication between a central control device having a source of timing signals and a source of electrical power signals, and one or more remote controlled devices, comprising:

plurality of industrial communications units (ICU) means, including master ICU means responsive to the central control device and slave ICU means responsive to each remote controlled device, said master and said slave ICU means each having a device input/output (I/O) interface adapted for signal connection to the associated device and a bus I/O interface adapted for signal connection to a signal bus, said ICU means exchanging signal data between said bus I/O interface and said device I/O interface, each of said ICU means transmitting and receiving signal data to and from said signal bus as serial bit digital signals, each of said ICU means further including an electrical power input;

signal bus means, having a data signal transmission line and an electrical power signal line, said data signal transmission line comprising two conductors adapted for connection to said bus I/O interface of each ICU means, and having a characteristic signal impedance, said electrical power signal line comprising two conductors including a high potential line and a low potential line, and adapted for connection between the system source of electrical power signals and said electrical power input of each ICU means, said signal bus means providing electrical power to each of said ICU means and providing a signal communicating path for exchanging said serial bit digital signals between said ICU means; and impedance network means, one connected to each end of said signal bus transmission line, and having a signal impedance substantially equal to said characteristic signal impedance of said signal bus transmission line.

2. The system of claim 1, wherein:

said master ICU means formulates the signal data signals exchanged periodically through said device I/O interface between the central control device and each remote controlled device, into a plurality of serial signal bit packets in each of successive transceive cycles, one signal packet for each remote controlled device and each signal packet comprising a plurality of serial signal bits, each transceive cycle including a synchronization frame indicative of the transceive cycle signal frequency as determined by the system source of timing signals, a transmit interval in which said master ICU transmits signal packets from the central control device to each slave ICU for presentation to the associated remote controlled device, and a receive interval in which said master ICU receives signal packets for presentation to the central control device from each slave ICU.

3. The communications system of claim 1, wherein said transmission line comprises an unshielded, twisted wire pair.

4. The communications system of claim 1, wherein said transmission line conductors are each comprised of wire sizes in the range of 18 to 24 AWG.

5. The communications system of claim 1 wherein said transmission line conductors each comprise stranded wire conductors.

6. The system of claim 1, wherein:

said impedance network means each comprise dual low pass filters, each filter having a signal impedance value substantially equal to said transmission line characteristic impedance, and each connected between an end of an associated one of said transmission line conductors and a signal ground center tap of said termination network.

7. The communications system of claim 1, wherein said low potential line of said electrical power distribution line is further connected to said signal ground center taps of each of said termination networks, to provide an electrical current return path from said transmission line to the external voltage signal source.

8. The communications system of claim 7 wherein said central station unit and said remote station units each comprise:

low pass signal frequency filter means, one for each of said transmission line dual conductors, each connected to said bus signal port for attenuating high frequency common mode voltage signals appearing on the associated transmission line conductor to provide frequency filtered output signals;

voltage regulator means connected for response to said electrical input power port for providing a regulated amplitude voltage signal in response to the electrical energy presented thereto; and communication unit means responsive at a data input thereof to said filtered output signals and responsive at another input to said voltage regulator means, and including therein said I/O signal ports, for controlling the exchange of signal information between said I/O signal port.

9. The communications system of claim 8, wherein said communication unit means further comprises digital signal filter means, one for each of said low pass signal frequency filter means, for providing digital noise filtering of each of said frequency filtered signals prior to presentation thereof at said I/O signal port.

* * * * *